Patented Nov. 27, 1945

2,389,628

UNITED STATES PATENT OFFICE 2,389,628

LINEAR POLYAMIDES

Elmore Louis Martin, Wilmington, Del., assignor to E. I. du Pont de Nemours & Company, Wilmington, Del., a corporation of Delaware No Drawing. Application September 17, 1942, Serial No. 458,735

4 Claims. (Cl. 260—78)

This invention relates to polymeric materials and more particularly to linear polyamides.

Polyamides of the nylon type prepared from diaminedicarboxylic acid mixtures and monoaminomonocarboxylic acids are relatively chemically inert to most reagents and do not readily lend themselves to further chemical transformations after being formed into useful products. Fiber-forming polyamide compositions have been prepared in which one or more of the reactants contain a lateral substituent, or group, usually an alcoholic or phenolic group, as a means for altering the properties of the polyamide through chemical reactions specific for the lateral group. However, the conditions necessary to bring about reaction of the hydroxyl group are rather drastic and often involve the amide groups which results in degradation of the polymer.

This invention has as an object the preparation of new polyamides having a lateral substituent by means of which the properties of the polyamides can be more readily varied by chemical reactions. A further object is the production of polymeric products useful in the textile and other arts. Other objects will appear hereinafter.

The above objects are accomplished by heating under amide-forming conditions a polyamide-forming composition comprising at least one reactant containing a lateral substituent which is a mercapto group removed by at least three atoms from each amide-forming group of said reactant, and continuing the reaction until a fiber-forming product is obtained.

The polymer-forming compositions used in the practice of this invention possess, in addition to the known requirements for reactants yielding fiber-forming polyamides, the additional requirement of the presence of the mercapto group and its position in the chain as pointed out above. Thus, as in other polyamides of the present type, the reacting material consists essentially of bifunctional molecules each containing two reactive groups which are complementary to reactive groups in other molecules and which include complementary amide-forming groups. These polyamides, which in addition to the recurring amide groups can contain ester or other groups in the chain, are obtainable by self-polymerization of a monoaminomonocarboxylic acid, by reacting a mixture of diamine and dibasic carboxylic acid (preferably in the form of the salt to insure equimolecular proportions), or by reacting a monoaminomonohydric alcohol with a dibasic carboxylic acid in substantially equimolecular amounts. As understood in the art the various equivalent amide-forming derivatives can be used instead of the above mentioned reactants.

In obtaining the improved polyamides of this invention at least one of the component bifunctional reactants of the polyamide-forming composition contains as a lateral substituent a mercapto group separated by at least three atoms from each amide-forming group contained in the reactant. It is essential that the mercapto group be separated at least three carbon atoms from the amide-forming groups in order to obtain polyamides in which the mercapto group is stable. For example, polymers obtained from dicarboxylic acids having the mercapto group in the alpha position have been found to lose hydrogen sulfide readily, and beta-mercaptocarboxylic acids in themselves lose hydrogen sulfide under mild conditions. Examples of polyamide-forming compositions containing mercapto groups which are stable in this respect and which are useful in this invention are as follows: 3-mercapto-1,5-diaminopentane, which is reacted with a suitable dicarboxylic acid such as adipic or sebacic; 5-mercaptosebacic acid, which is reacted with hexamethylene diamine or other suitable diamine; and 6-amino-4-mercaptocaproic acid in the case of the self-polymerizable amino acids. Either one or a plurality of the reactants in the polyamide-forming composition can contain a mercapto group.

The polymers described in this invention are obtained by heating reactants of the above mentioned kind under amide-forming conditions, usually at 150°–225° C. until a polymer of the desired properties is obtained. If a continuous filament is obtained by touching the surface of the molten polymer with a rod and withdrawing the rod, the polymer can be formed in general into continuous filaments capable of being cold drawn. The reactants can be heated in a closed or open reaction vessel in the presence or absence of a diluent (solvent or non-solvent), usually under an inert atmosphere. In its preferred embodiment the reaction is carried out at temperatures below 225° C. At higher temperatures, the polymer tends to become more brittle and highly colored and somewhat inferior to products prepared at lower temperatures. In the final stage of the reaction the conditions should be such that any by-products of the reaction—alcohol, water, phenol, hydrogen chloride, or ammonia—are permitted to escape.

The following examples, in which the quantities are in parts by weight, are further illustrative of the practice of this invention.

Example I

A mixture of 2.654 parts of hexamethylene diamine and 3.954 parts of the lactone of 4-mercaptopimelic acid was heated in a closed reaction vessel at 190° C. for one hour. After cooling the vessel was opened and heated as follows: One hour each at 202° C. and 218° C. at atmospheric pressure, under nitrogen, one hour at 218° C. and 20 mm. and finally for three hours at 218°

C. and 1 mm. pressure. The polymer was a clear, tough solid which softened at about 150° C. and pressed films were capable of being cold drawn as much as 200%.

Particularly valuable are the interpolymers obtained by reacting the mercapto diamine or dicarboxylic acid in substantial amount in admixture with a diamine and a dibasic carboxylic acid not containing a lateral substituent, the total diamine and dibasic acid present in the mixture being in equimolecular amounts. The following examples describe the production of polymers of this kind.

Example II

A mixture of 3.80 parts of hexamethylene diamine, 2.39 parts of adipic acid and 2.85 parts of the lactone of 4-mercaptopimelic acid was heated in a closed reaction vessel at 180°-190° C. for one-half hour. After cooling the vessel was opened and the heat treatment was continued as follows: One hour each at 202° C. and 218° C. at atmospheric pressure under nitrogen and finally for three hours at 218° C. and 1 mm. pressure. The polymer prepared by the above procedure was a light yellow, tough, opaque solid which melted at about 195° C. Pressed films of the polymer were soluble in 80% ethanol and addition of an oxidizing agent, as an alcoholic solution of iodine, caused precipitation of the polymer as an insoluble, infusible mass. After standing in the air for several hours the films became insoluble in 80% ethanol.

The polymer was spun into continuous filaments of fairly uniform denier by extruding the molten polymer at 230°-235° C. under gas pressure from a spinneret having an orifice 0.015" in diameter. The filaments could be cold drawn as much as 300%.

Example III

A mixture of 29.21 parts of hexamethylene diamine, 37.44 parts of sebacic acid, 11.33 parts of the lactone of 4-mercaptopimelic acid and 35 parts of phenol was heated as follows: One hour each at 202° C. and 218° C. at atmospheric pressure under nitrogen, one hour at 218° C. and 10 mm. and finally for three hours at 218° C. and 2 mm. pressure. After cooling the polymer was obtained as a tough, opaque solid which melted at about 200° C.

The polymer was spun into continuous filaments of fairly uniform denier by extruding the molten polymer at 218° C. under mechanical pressure from a spinneret having five holes, each 0.010" in diameter. The undrawn thread had an average denier of 135 and by the action of stress could be permanently stretched, elongated or cold drawn as much as 480%. The tensile strength of thread which had been cold drawn mechanically at a draw ratio of 4.8:1 was 2.72 g./d. with a residual elongation of 32.3%.

Example IV

A mixture of 29.57 parts of hexamethylene diamine, 33.28 parts of sebacic acid, 15.45 parts of the lactone of 4-mercaptopimelic acid and 50 parts of phenol was converted into a tough, opaque solid which melted at about 195° C. as described in Example II. Continuous filaments were obtained in a similar manner and were capable of being cold drawn as much as 300%. The tensile strength of filaments which had been cold drawn mechanically at a draw ratio of 2.2:1 was 1.78 g./d. with a residual elongation of 36.1%.

Example V

A mixture of 64.70 parts of hexamethylene diamine, 49.82 parts of pimelic acid, 22.31 parts of the lactone of 4-mercaptopimelic acid and 100 parts of phenol was heated as follows: One hour each at 202° C. and 218° C. at atmospheric pressure under nitrogen, one hour at 218° C. and 10 mm. pressure and finally three hours at 218° C. and 3 mm. pressure, the polymer was obtained as a tough solid which melted to a thick, viscous liquid at about 200° C. The sulfur content of the polymer was 2.79%, whereas the sulfur content based on added ingredients should have been 2.98%.

Continuous filaments were obtained as described in Example III. The undrawn yarn had an average denier of 155, and could be cold drawn as much as 400%. The tensile strength of filaments which had been cold drawn mechanically to a draw ratio of 3.5:1 was 1.33 g./d. with a residual elongation of 33%.

Suitable solvents in which the reaction can be carried out are phenol, meta-cresol, and o-hydroxy-diphenyl. The best results are obtained by operating in complete absence of oxygen which can be accomplished by means of an inert gas such as nitrogen. The polymer can be freed of solvent by direct distillation or the polymer can be precipitated by the addition of a solvent in which the polymer is insoluble such as ethyl acetate, acetone or alcohol. Final traces of phenolic solvent can be removed from the precipitated polymer by extraction with hot alcohol, acetone or ethyl acetate or by heating the polymer under reduced pressure at a temperature slightly above the melting point of the polymer. While it is usually unnecessary to add a catalyst, inorganic materials of alkaline reaction, such as oxides and carbonates and acidic materials such as halogen salts of polyvalent elements are often helpful. Phosphoric acid is also a useful catalyst.

Other mercapto compounds which can be used in the practice of this invention include diamines such as 3-mercapto-1,6-diaminohexane, 4-mercapto-1,7-diaminoheptane, 5-mercapto-1,9-diaminononane, and 6-mercapto-1,11-diaminoundecane, and mercapto dicarboxylic acids such as 4-mercaptosuberic acid, 5-mercaptoazelaic acid, and 6-mercaptoundecanedioic acid. The lactone can be considered as the amide-forming derivative of the corresponding acids since the lactones function similarly in polyamide-forming reactions. An example of a lactone of this kind is

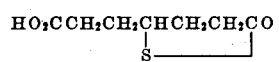

Examples of other self-polymerizable amino acids which can contain the mercapto group and which can be used as the sole reacting material or in conjunction with other linear polymer-forming materials are 8-amino-5-mercaptocaprylic acid and 10-amino-5-mercaptocapric acid.

In the diamine-dibasic acid polymers the complementary reactant is usually a diamine or dibasic acid not containing the mercapto group, and the best products from the standpoint of fiber manufacture are those in which mercapto diamines and dibasic acids are included with the usual diamines and dibasic acids not containing the mercapto lateral substituent, and are present in partial replacement of one or more of the conventionally used diamines and dibasic acids such that the amino and carboxylic groups are present in substantially chemically equivalent amounts. Suitable diamines of this kind which can be used in conjunction with the present mercapto compounds are ethylenediamine, trimethylenediamine, 1,4-diamino-cyclohexane, xylylenediamine, $$H_2N-(CH_2)_2-O-(CH_2)_2-O-(CH_2)_2NH_2$$

$$H_2N-(CH_2)_3-O-(CH_2)_3NH_2$$

$$H_2N-(CH_2)_3-S-(CH_2)_3-NH_2$$

1,10-diamino-1,10-dimethyldecane, 1,12-diaminooctadecane, m-phenylenediamine, N,N'-dimethylhexamethylene-diamine, 4,4'-diaminodiphenylmethane, and $$H_2N-(CH_2)_3-NCH_3-(CH_2)_3NH_2$$

The dicarboxylic acids used to replace a part of the mercapto dicarboxylic should be non-imide-forming in order to obtain fiber-forming polymers. Dicarboxylic acids having a radical length of at least 5 are in general valuable for replacing a part of the mercapto dicarboxylic acids because of the slight tendency of such dicarboxylic acids to form imides. The most desirable products are obtained from dicarboxylic acids having a radical length of at least 6, since these acids show practically no tendency to form cyclic imides. Examples of these dicarboxylic acids in addition to those previously mentioned include azelaic, terephthalic, isophthalic, p-phenylenediacetic, $$HOOC-(CH_2)_3-S-(CH_2)_3-COOH$$

diglycolic, phenylolpropane diacetic acid, and their amide-forming derivatives.

The mention herein of the mercapto amino acids, and diamines and dibasic acids containing a mercapto group as a lateral substituent is intended to include the corresponding amide-forming derivatives which, since the reactive or amide-forming groups are unchanged, can be equivalent polyamide-forming reactants as is known to be the case with the conventional polyamide-forming reactants not containing the mercapto group. These derivatives can be replaced with their amide-forming derivatives which in the case of the diamines include the carbamate and formal derivatives, and in the case of the dibasic carboxylic acids include the esters, anhydrides, acid chlorides, amides and nitriles. The lactams containing at least 7 atoms in the ring and a mercapto group can be used in place of the corresponding amino acids.

For certain purposes it is desirable that the polymer be viscosity stable, that is, does not alter appreciably in viscosity (molecular weight) when heated at its melting point. Viscosity stable polyamides can be prepared by using a small excess (up to 5 mol per cent) of the diamine or dicarboxylic acid and by incorporating in the reaction mixture a small amount, generally 0.01-0.5%, of a monoamine or monocarboxylic acid or amide-forming derivatives thereof. Acetic acid, 2-ethyl-hexylamine and ethyl butyrate are examples of viscosity stabilizers.

Continuous filaments can be obtained by the known methods from the present polymers. Thus the polymer can be formed into filaments by extruding the molten polymer into an atmosphere where it congeals into filaments as indicated in the examples. Filaments of the polymer can also be obtained by dissolving the polymer in a suitable solvent and extruding the solution into a coagulating bath or by extruding the solution into a heated chamber where the solvent is removed by evaporation.

The present polyamides present several advantages over the similar polyamide products previously prepared. The mercapto group offers a ready point of attack on the polyamide molecule for other reagents which impart new and useful properties to the polyamides, particularly after the polymer has been formed into films and fibers. Treatment of the fiber-forming polyamides containing as a lateral substituent a mercapto group with an oxidizing agent, a diisocyanate or a dihalide alters its cold drawing properties and increases its tenacity and resiliency, and decreases solubility. Oxidizing agents such as halogens, oxides of nitrogen, potassium permanganate, nitrosyl chloride, hydrogen peroxide, air, and the irradiation by ultra-violet light can be employed for this purpose. The films and fibers of polymers prepared from a mercapto containing polyamide ingredient show excellent dye receptivity.

The polymers of this invention, in addition to synthetic fibers and bristles, can be formed into a variety of other valuable products which include rods, hollow tubes, films, foils and ribbons. They can also be used in molding compositions and in coating and impregnating compositions. In all of the above uses the products may be mixed with other materials such as plasticizers, resins or pigments.

As many apparently widely different embodiments of this invention may be made without departing from the spirit and scope thereof, it is to be understood that I do not limit myself to the specific embodiments thereof except as defined in the appended claims.

I claim:

1. A polyamide comprising the reaction product of a linear polymer-forming composition consisting essentially of bifunctional amide-forming material comprising a mixture of 4-mercaptopimelic acid and diamine.

2. A polyamide comprising the reaction product of a reaction mixture of bifunctional amide-forming reactants containing at least one amide-forming reactant having a mercapto group as a lateral substituent, said reaction mixture consisting essentially of 4-mercaptopimelic acid in admixture with amide-forming reacting material not containing a lateral substituent and consisting of diamine and dibasic carboxylic acid, the total diamine and dibasic carboxylic acid present in said reaction mixture being present in equimolecular amounts.

3. A process for making polymers which comprises heating at 150° C. to 225° C., under amide-forming conditions, a linear polymer-forming composition consisting essentially of bifunctional amide-forming material comprising a mixture of 4-mercaptopimelic acid and diamine.

4. A process for making polymers which comprises heating at 150° C. to 225° C., under amide-forming conditions, a reaction mixture of bifunctional amide-forming reactants containing at least one amide-forming reactant having a mercapto group as a lateral substituent, said reaction mixture consisting essentially of 4-mercaptopimelic acid in admixture with amide-forming reacting material not containing a lateral substituent and consisting of diamine with dibasic carboxylic acid, the total diamine and dibasic carboxylic acid present in said reaction mixture being present in equimolecular amounts.

ELMORE LOUIS MARTIN.